May 2, 1944.  R. S. MILLER  2,348,087
WELDING APPARATUS
Filed Nov. 22, 1941
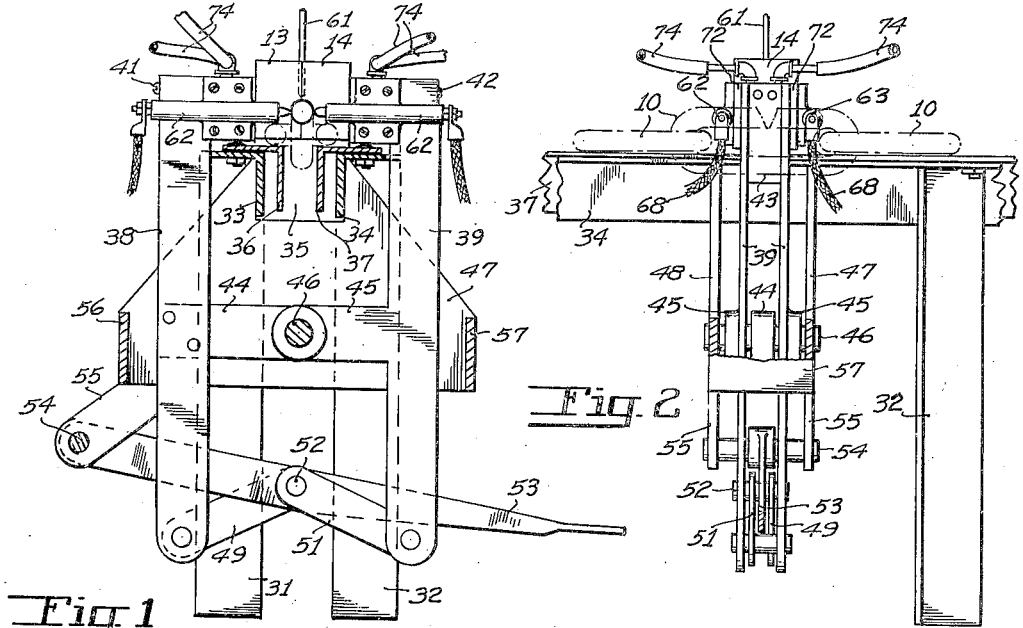
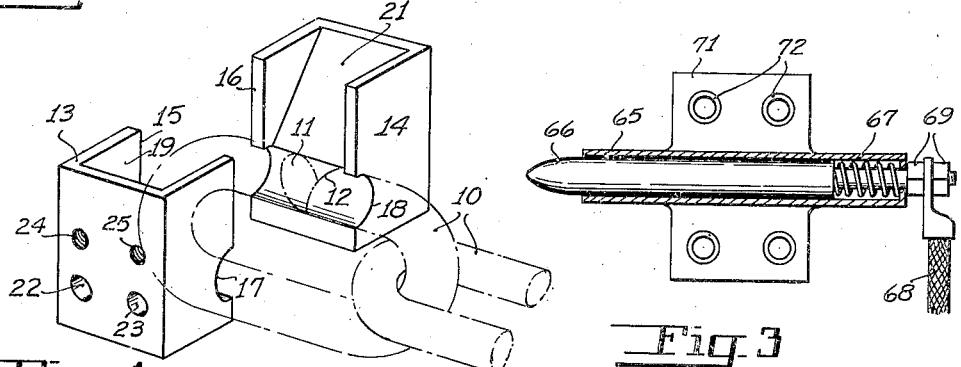
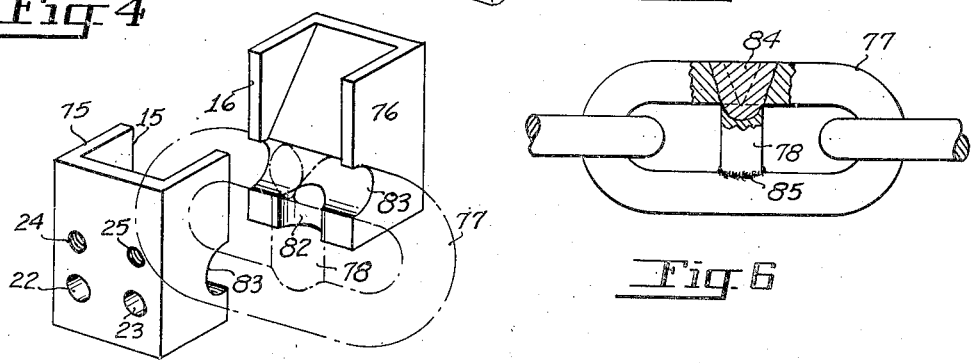
ROBERT S. MILLER
INVENTOR.
BY
ATTORNEY Patented May 2, 1944

2,348,087

UNITED STATES PATENT OFFICE 2,348,087

WELDING APPARATUS

Robert S. Miller, Portland, Oreg., assignor to Pacific Chain and Manufacturing Company, Portland, Oreg., a corporation of Oregon Application November 22, 1941, Serial No. 420,092

18 Claims. (Cl. 219—8)

The present invention relates to welding apparatus, and has particular reference to apparatus for facilitating the welding together of the ends of metal bars, and more especially the returned ends of a bar section which has been preformed or bent into a chain link.

In butt welding metal members together so that the members are solidly fused throughout the full cross section thereof, there is a tendency for the weld metal to run out through the bottom of the seam. To avoid this, it is a common practice to provide a first, relatively shallow backing weld along one side of the seam whereby the escape of molten weld metal is prevented as the subsequent main welding operation is performed upon the opposite side. Frequently, because of the nature of the particular structure of the members upon which the welding operation is to be performed, the dual weld cannot successfully be applied and the welding must all be done from one side. In such latter instances the welding process may be facilitated by the provision of a backing-up strip applied to the underneath surface of the members along the seam for preventing escape of the molten weld metal. In the case of metal bars having a relatively great thickness as compared with the width, such as square or round bars, the escape of weld metal from the opposite sides of the seam, as well as from the bottom, must also be prevented. In such latter instances the backing-up strip must extend along not only the back side of the seam, but also up along the opposite sides of the bar members in order to be effective. Backing-up strips of such shape are in themselves difficult to form, awkward to clamp in place, and are unsatisfactory for quantity production procedures.

Considering specifically the manufacture of chains in which each link comprises a preformed section of round metal bar having a pair of ends to be fused by a solid weld therebetween, the welding operation may be carried out successfully from only one side of the link, due to the insufficient clearance at the inside of the link for conveniently applying a preliminary backing weld. A conventional form of backing-up strip is difficult to use in this instance because of the relatively small opening through the link and the difficulties involved in holding it in place during the welding operation, and subsequently in effecting the removal thereof.

It is an object of the invention, therefore, to provide a new and improved apparatus for facilitating the welding together of the returned ends of a metal bar.

It is a further object of the invention to provide a new and novel apparatus for facilitating the welding together of ends of metal bars whereby the molten weld metal is substantially confined within the effective area, and which apparatus is relatively simple in design, and efficient in operation.

More specifically, it is an object of the invention to provide a new and improved apparatus for facilitating the welding of chain links and the like of preformed metal bars whereby the welding operation may be carried out from one side of the link and the molten weld metal retained within a predetermined area.

In accordance with one form of the invention, the welding apparatus comprises a pair of complementary mold blocks having substantially vertical matching faces with transverse recesses provided in such faces for cooperatively fitting around the aligned end portions of a bar to be welded together. The matching faces of the blocks are provided with cooperating recesses extending vertically between the transverse recesses and the upper surface of the blocks for permitting the insertion of a welding rod downwardly therethrough for effecting the welding operation, the escape of molten metal from the region between the bar ends being precluded by the surrounding blocks. The vertically extending recesses together define a hopper for receiving a quantity of welding flux material for enhancing the properties of the finished weld. The mold blocks are mounted upon suitable supports arranged on opposite sides of the work whereby they are movable laterally with respect to each other and the work to permit shifting of the work between successive welding operations. The mold blocks are of any suitable material such as copper, and are provided with internal passages for the circulation of a cooling liquid which may be introduced through suitable conduit connections. In order that there will be no current flow through the mold blocks, as when metal, such as copper, is used therefor, separate ground electrodes are mounted upon the mold block supports, insulated with respect thereto, and are movable thereby into contacting relation with the work.

Further objects and advantages of the invention will become apparent to those skilled in the art from a perusal of the following description taken in connection with the accompanying drawing, while the features of novelty characterizing the invention will be pointed out with greater particularity in the appended claims.

In the drawing, Figure 1 is an end elevation of a welding apparatus constructed in accordance with one form of the invention; Figure 2 is a side elevation of the apparatus illustrated in Figure 1; Figure 3 is a detail view, partly in section, illustrating the mounting for one of the ground electrodes of the apparatus; Figure 4 is an exploded view in perspective of a pair of mold blocks embodied in the apparatus of Figures 1 and 2 and shown with relation to a workpiece; Figure 5 is a perspective view of a pair of mold blocks constructed in accordance with a modification of the invention; and Figure 6 is a side elevation illustrating a chain stud link which has been welded with mold blocks of the modified structure illustrated in Figure 5.

Referring first to Figure 4, a workpiece is shown which, in this instance, comprises a section of chain made up of a plurality of links 10 each being formed from a length of round metal bar, the aligned ends 11 and 12 of which are to be welded together for the completion of a link. The adjacent ends 11 and 12 are cut at an angle defining a welding V therebetween facing upwardly with the link vertically arranged. While in this particular instance reference is made to a chain link, and while the instant invention is particularly suitable for carrying out welding operations upon such articles, it will become obvious as the disclosure proceeds that the invention is not necessarily so limited. The adjacent ends 11 and 12 of the metal bar forming each chain link are representative of the adjacent ends of any pair of metal bars or members, or portions thereof, which are to be united by a welding operation to be performed from one side thereof.

In order to confine the pool of molten weld metal within the area between the adjacent link ends 11 and 12, a pair of mold blocks 13 and 14 are provided having a pair of facing matching faces 15 and 16, respectively, and which are adapted to be moved toward each other from the opposite sides of the workpiece. The facing surfaces are provided with horizontally extending aligned recesses 17 and 18 which cooperate to define a transverse passage having a cross sectional dimension substantially equal to that of the workpiece ends 11 and 12; so that when the blocks are moved into an engaging relation of their faces 15 and 16 the link ends 11 and 12 are substantially enclosed. The facing surfaces of the blocks 13 and 14 are further recessed as indicated at 19 and 21, respectively, which recesses are aligned and cooperate to define a generally vertical passage extending from the upper surface of the blocks and communicating at the lower end with the passage defined by the recesses 17 and 18. A welding rod may be inserted downwardly through the passage defined by the recesses 19 and 21 for the purpose of effecting a weld between the ends 11 and 12. In the preferred form shown the recesses 19 and 21 diverge upwardly further defining, in addition to merely a passage for a welding rod, a hopper into which may be placed a suitable quantity of a loose welding flux material for enhancing the properties of the finished weld. Since the mold blocks fit closely around the end portions 11 and 12 of the workpiece, the relatively slight remaining space therebetween will be substantially sealed by molten flux, which will also cover the weld, so as substantially to preclude contact by air with the surface of the molten weld metal.

The blocks 13 and 14 may be of any suitable material such as copper or a dense, high melting point refractory. In order to minimize deterioration of the material of the blocks due to the high heat created by the welding operation, it is preferred that the blocks 13 and 14 be cored out so as to provide internal passages for the circulation of cooling liquid therethrough, openings 22 and 23 being shown in the back surface of the block 13 to which may be connected fluid inlet and discharge conduits. Each block may be tapped as at 24 and 25 for facilitating mounting the blocks upon suitable supports, whereby they may be moved into a cooperative surrounding relation with the workpiece, which in turn may be carried upon a stationary part of the support structure.

Referring now particularly to Figures 1 and 2, the supporting structure shown includes a plurality of uprights 31 and 32 which at their upper ends are secured to a pair of horizontally extending parallel angle members 33 and 34 which angle members are further arranged in a back to back relation with a space 35 therebetween. Adjustably secured to the horizontal flanges of the angle members 33 and 34 are the horizontal flanges of an additional pair of angle members 36 and 37, the vertical flanges of which depend downwardly into the space 35, the angle members 36 and 37 extending parallel with the angle members 33 and 34 and defining a space therebetween which may be adjusted to a corresponding dimension of a portion of a workpiece upon which the welding operation is to be performed, a portion of which may depend therebetween. In the specific arrangement shown the supporting structure is adapted particularly for holding a plurality of links of a chain, alternate links being shown as resting horizontally across the horizontal flanges of the angle members 36 and 37 while the intermediate links extend vertically with respect thereto, the lower sides of the vertically extending links depending downwardly into the space 35 between the vertical flanges of the angles 36 and 37. As the welding operation is completed upon each of the successive vertically extending links, the chain may be pulled by any suitable means, not shown, along the supporting table. Upon reaching the end of the length of chain, the chain may be rotated through an angle of 90 degrees so as to arrange the alternate series of links in the vertical position and which may in turn be welded to complete the welding of the chain structure.

The mold blocks 13 and 14, as previously described, are mounted upon the upper ends of corresponding pairs of arms 38 and 39, the blocks 13 and 14 being secured by bolts 41 and 42 to spacer blocks 43 secured between the upper ends of the pairs of arms 38 and 39, respectively. The pairs of arms 38 and 39 are provided with T extensions 44 and 45, respectively, intermediate their ends and which are pivotally mounted upon a bolt 46 supported between a pair of opposite side plates 47 and 48. The side plates 47 and 48 are secured at their upper ends as by welding to the outer surfaces of the vertical flanges of the horizontal angles 33 and 34. The lowermost ends of the pairs of arms 38 and 39 are connected by toggle links 49 and 51 by a pin 52 to an intermediate point of an operating lever 53, which lever is pivotally secured as at 54 to a pair of bracket arms 55 depending from the side plates 47 and 48. The arrangement of the toggle links and lever 53 relative to the arms 38 and 39 is such that as the operating lever 53 is moved in the counterclockwise direction the toggle links 49 and 51 are collapsed to permit the arms 38 and 39 to pivot about the bolt 46 and the upper ends thereof to move laterally outwardly with respect to each other and to the workpiece or chain link. Outward movement of the arms 38 and 39 is limited by engagement with the pieces 56 and 57 bridging the outermost ends of the side plates 47 and 48. Conversely, upon movement of the lever 53 in the opposite direction, which may be effected as by stepping upon the outer end of the lever 53, the upper ends of the arms 38 and 39 are moved relatively toward each other and into cooperative surrounding relation to a chain link.

While the welding operation upon the workpiece enclosed within the mold blocks 13 and 14 may be carried out according to any well known process, in the specific adaptation herein described provision is made for carrying out the operation by an electric arc welding process. In such a process current flow takes place between a metal welding rod, such as is indicated at 61, extending downwardly into the mold blocks, and the workpiece which is connected to ground. In order that current flow does not take place between the workpiece and the mold, in the event that the mold blocks consist of copper or other electrically conductive substance, and in which event there would be a tendency for the workpiece to fuse with the mold blocks, it is preferred to arrange a plurality of grounding electrodes for effecting the ground connection with the workpiece. Pairs of opposed electrodes 62 and 63 are provided on the opposite sides of the mold block supports and which are adapted to be moved into contacting relation with the opposed surfaces of the workpiece outside of the mold blocks 13 and 14 by the operation of the movable supports. One of the electrode assemblies is shown in greater detail in Figure 3 and comprises an elongate tube 65 within which is slidably arranged a cylindrical contact member 66, the forward point of which extends beyond the end of the tube 65 for effecting a conductive contact with the surface of the workpiece. The contact rod 66 is resiliently biased in the direction of the point by means of a spring 67 arranged around a portion of reduced diameter at the end opposite the point, and bearing against an inwardly turned flange at the end of the tube 65. A connection cable 68 is secured to a threaded end of the contact member 66 projecting beyond the rear end of the tube 65 between a pair of nuts 69. The tube 65 is rigidly secured as by welding to a mounting plate 71 by means of which the electrode assembly may be secured to the opposite sides of the block 43 forming a part of the supporting structure for the mold blocks 13 and 14. Suitable insulation, as indicated at 72, is provided between the plate 71 and the blocks 43, insulation 73 being also provided around the bolts fastening the electrode assemblies in place. With electrodes arranged as described, as the mold blocks are moved into a cooperative surrounding relation with respect to the workpiece, the ends of the electrode contacts engage with the opposite sides of each of the metal portions extending from the opposite ends of the transverse passage 17—18 of the mold blocks. Positive contact pressure of the electrode contacts against the workpiece is insured by the arrangement of the springs 67, while at the same time complete closure of the mold blocks about the workpiece may be effected.

Cooling liquid for the mold blocks may be supplied through suitable conduits 74 connected into the inlet and discharge openings 22 and 23 through suitable passages in the blocks 43 to which the mold blocks are attached.

The mold blocks 13 and 14, as described, are suitable for facilitating butt welding the ends of a pair of metal rods, and by simple modification of design they may be adapted for welding together a plurality of parts greater than two by a single welding operation. For example, three parts may be simultaneously welded together by enclosing all of the respective ends in the mold and applying weld metal to the common juncture of the various ends.

For a specific illustration of the last mentioned modification, reference may be had to Figure 5, in which is shown mold blocks 75 and 76 designed for facilitating the welding of stud type chain links, one of which is illustrated in greater detail in Figure 6. The stud link in this instance comprises an outer portion 77 similar to the link 10 and a transversely extending stud portion 78. The upper end of the stud portion 78 may be welded to the outer link simultaneously with the welding together of the ends thereof by use of the mold blocks 75 and 76.

The mold blocks 75 and 76 are similar to the mold blocks 13 and 14 as previously described, except that the face surfaces of each is provided with an additional vertically arranged recess 82 between the transverse recesses 83 and the lower surface of the block for the accommodation of the stud portion 78. As the mold blocks are moved together about the upper side of the link, the short stud section is inserted within the link with the upper end directly beneath the welding V. As the molds are closed, the stud portion is securely held by the recesses 82 in the proper position and the weld 84 may then be formed. It will be observed that the lower end of weld 84 penetrates into the upper end of the stud portion 78 to fuse it solidly throughout its cross sectional area to both ends of the outer link portion. The opposite, or lower end of the stud portion may subsequently be welded as at 85 to the adjacent side of the link.

Having now described my invention and in what manner the same may be used, what I claim as new and desire to protect by Letters Patent is:

1. Welding apparatus comprising a pair of complementary mold blocks separable along a substantially vertical plane, a horizontal transverse passage through said blocks for cooperatively receiving aligned ends of a metal bar, said passage being defined by a pair of matching recesses provided in adjacent faces of said blocks, said recesses defining a space between said bar ends of substantially the same cross sectional area as said bar ends, a vertical passageway extending from said transverse passage to the upper surface of said blocks, said vertical passageway being defined by matching recesses provided in adjacent faces of said blocks, said vertical passageway extending into the space between the ends of said metal bar.

2. Welding apparatus comprising a pair of complementary mold blocks separable along a substantially vertical plane, a horizontal transverse passage through said blocks for cooperatively receiving aligned metal bar ends, said passage being defined by a pair of similar matching recesses provided in adjacent faces of said blocks, said recesses defining a space between said bar ends of substantially the same cross sectional area as said bar ends, a vertical passageway extending from the upper surface of said blocks into said transverse passage and into the space between adjacent bar ends arranged in said transverse passage, said vertical passageway being defined by matching recesses provided in adjacent faces of said blocks, said vertical passageway being adapted for receiving a quantity of welding flux and a welding rod extending into the region of said bar ends.

3. Welding apparatus comprising a pair of complementary mold members separable along a substantially vertical plane, a horizontal transverse passage through said members for cooperatively receiving aligned metal bar ends to be welded together, said passage being of substantially the same cross sectional area as said bar ends for at least the distance between said bar ends, a vertical passage extending upwardly from the space between adjacent bar ends, said passages being formed by similar matching recesses provided in adjacent faces of said members, said vertical passage being adapted for receiving a welding rod extending into the region between adjacent bar ends and a quantity of loose welding flux.

4. Welding apparatus comprising a pair of complementary mold blocks having a pair of substantially vertical matching faces, a support for holding a metal workpiece to be welded, means for supporting said blocks on opposite sides of said workpiece and movable relative to each other and to said workpiece, a transverse passage through said blocks defined by matching recesses provided in said faces for fitting cooperatively and relatively closely around said workpiece, said passage being of substantially the same cross sectional area as said work-piece adjacent the point thereof to be welded, said blocks having recesses in adjacent faces defining a passageway extending from the upper surface thereof downwardly into said transverse passage, said passageway being adapted for receiving a quantity of welding flux and a welding rod extending downwardly to said workpiece.

5. Apparatus for welding chain links, said apparatus comprising a support for holding a chain link in a substantially vertical plane with the side thereof to be welded arranged uppermost and extending substantially horizontally, a pair of complementary mold blocks, a horizontal transverse recess provided in each of the facing surfaces of said blocks for fitting cooperatively and relatively closely around said upper side of said link, recesses in the facing surfaces of said blocks defining a passageway extending downwardly from the upper surface thereof communicating with the transverse recess above the point of said chain link to be welded, means for movably supporting said blocks on opposite sides of said link for movement laterally relative to said link.

6. Apparatus for arc welding chain links comprising a support for holding a chain link in a substantially vertical plane with the side thereof to be welded arranged uppermost and substantially horizontally, a pair of complementary mold blocks having a pair of matching faces, a transverse recess provided in each of said faces for fitting cooperatively and relatively closely around said side of said link, recesses in said block faces defining a passageway extending downwardly from the upper surface thereof to said transverse recess, said passageway being adapted for receiving a welding rod extending downwardly to said chain link, movable supports for each of said blocks permitting lateral movement thereof relative to each other and to said chain link, ground electrodes carried by said block supports and movable thereby into contact with said link.

7. Welding apparatus comprising a pair of complementary mold blocks separable along a substantially vertical plane, a horizontal transverse passage through said blocks for cooperatively receiving aligned ends of bars to be united, said passage being of substantially the same cross section throughout its length as said bar ends, a generally vertical passage extending downwardly into said transverse passage, said passages being defined by matching recesses provided in adjacent faces of said blocks, means for supporting said aligned bar ends, means for pivotally supporting each of said mold blocks for lateral movement relative to said bar ends.

8. Welding apparatus comprising a pair of complementary mold blocks having a pair of substantially vertical matching faces, transverse matching recesses provided in said faces for fitting cooperatively and relatively closely throughout substantially the full width of said blocks around adjacent ends of aligned metal bars to be welded together, aligned recesses in said faces extending upwardly from said transverse recesses providing a passage extending into the space between adjacent bar ends, means for supporting metal bar ends in a substantially aligned relation, means for supporting said pair of blocks for relative lateral movement with respect to each other and to said bar ends, and actuating means for said last mentioned supporting means for moving said blocks into cooperative surrounding relation relative to said bar ends.

9. Apparatus for welding chain links, said apparatus comprising a support for holding a chain link in a substantially vertical plane with the side thereof to be welded arranged uppermost, a pair of complementary mold blocks having a pair of matching faces, a transverse recess provided in each of said faces for fitting cooperatively and relatively closely around the side of the link to be welded, recesses in said block faces defining a passageway extending downwardly from the upper surface of said blocks communicating with the transverse recesses above the point of said chain link to be welded, said vertical passage being adapted for receiving a quantity of welding flux and a welding rod extending therethrough to the region of the chain link.

10. Apparatus for electrically welding chain links comprising a support for holding a chain link in an upright position with the side thereof to be welded being arranged uppermost and substantially horizontally, a pair of complementary mold blocks having transverse recesses in the facing surfaces thereof for fitting cooperatively and relatively closely around the side of said link to be welded, a passageway extending downwardly from the upper surface of said blocks into communication with said transverse recesses above the point of said chain link to be welded, movable supports for mounting said blocks on opposite sides of said link, ground electrodes carried by said block supports and movable thereby into contacting relation against said link, passages through each of said blocks for circulation of cooling liquid therethrough, and fluid conduits connected to said block supports and communicating with said block passages.

11. Apparatus for welding chain stud links comprising a pair of complementary mold blocks separable along a substantially vertical plane, a horizontal transverse passage through said blocks for cooperatively receiving the side of the link to be welded, said passage being defined by a pair of matching recesses provided in adjacent faces of said blocks, a passage extending at right angles with respect to said horizontal passage defined by matching recesses provided in the adjacent faces of said blocks for cooperatively receiving a stud to be welded to said side of said link, one end of said last mentioned passage communicating with said transverse passage substantially centrally thereof, and a passage extending upwardly from said transverse passage for receiving a welding rod extending into the region of said chain link.

12. Apparatus for facilitating the uniting of the ends of a plurality of metal members together by a single weld, said apparatus comprising a pair of complementary members having matching faces, recesses in said faces defining intersecting passages for cooperatively receiving the end portions of said metal members and defining spaces therebetween of substantially the same cross sectional area as said metal members, additional recesses in said faces defining an additional passage extending into said spaces through which a welding rod may be introduced for filling said spaces with weld metal homogeneously fusing and uniting said metal members.

13. In the art of manufacturing a stud link metal chain, the method of weld uniting the ends of a stud link to each other and to the stud in one operation, and while such link is interlinked with adjoining links, which comprises holding the extremities of said ends in juxtaposed relation; positioning a stud with one end substantiallly abutting said extremities; at the same time, completely enclosing those portions of said ends adjacent said extremities, the major region along the peripheries of said extremities, and at least a portion of said stud, but leaving exposed a space between said extremities and the remainder of said peripheries and also exposing the remainder of the stud and link undergoing welding and the link interlinked therewith; depositing granular fusible welding material into said space and upon the exposed portions of the peripheries of said extremities; and advancing a metal welding rod into said material while passing from said rod through said material to said extremities, an electric welding current of sufficient magnitude to melt metal from said rod to fuse at least a portion of said material, and to coalesce such melted metal with fused portions of said extremities and the end of said stud.

14. Chain link welding apparatus comprising, in combination, a pair of separable molds, the opposing surfaces of said molds each being formed with a longitudinally extending groove conforming substantially to the link to be welded; each of said opposing faces being formed with a substantially central recess extending from an external face of the mold to such groove.

15. For use in welding, a substantially rectangular block of heat conductive material, one side of said block being formed with a pair of intersecting work receiving grooves and a recess extending from a face of said block into one groove adjacent the intersection of said one groove with the other groove.

16. Stud chain link welding apparatus comprising, in combination, a pair of separable molds, the opposing surfaces of said molds each being formed with a transversely extending groove conforming substantially to the link to be welded and a longitudinally extending groove conforming substantially to the stud of such link and intersecting said transversely extending groove; each of said opposing faces being formed with a substantially central recess extending from an external face of the mold to such transversely extending groove.

17. Welding apparatus comprising, in combination, a pair of heat conductive separable molds having opposing surfaces so shaped that, when in abutment, such surfaces form recesses conforming substantially to the work to be welded, said molds also being formed to provide, when in abutment, a hopper extending from an external face of said molds into one of such recesses, and each mold being formed with a cooling fluid passage; and means for moving said molds into and out of abutting relation, said means comprising a block secured to each mold and each formed with cooling fluid inlet and outlet passages registering with the cooling fluid passage in its associated mold, pivotally mounted links secured to each block, and means connected to said links to pivot the same and move said molds into and out of abutting relation.

18. Welding apparatus comprising, in combination, a pair of heat conductive separable molds having opposing surfaces so shaped that, when in abutment, such surfaces form recesses conforming substantially to the work to be welded; said molds also being formed to provide, when in abutment, a hopper extending from an external face of said molds into one of such recesses, and each mold being formed with a cooling fluid passage; means for moving said molds into and out of abutting relation; and studs secured to said last named means and adapted to contact the work to be welded, when said molds are in abutment, to provide an electrical ground connection for such work.

ROBERT S. MILLER.